(12) United States Patent
Lekar et al.

(10) Patent No.: US 7,717,158 B2
(45) Date of Patent: May 18, 2010

(54) SIDE WINDOW ROLL-UP SHADE WITH CABLE DRIVE

(75) Inventors: Jan Lekar, Reichenbach (DE); Melf Hansen, Gondelsheim (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 12/047,423

(22) Filed: Mar. 13, 2008

(65) Prior Publication Data

US 2008/0223531 A1  Sep. 18, 2008

(30) Foreign Application Priority Data

Mar. 14, 2007   (DE) ........................ 10 2007 012 978

(51) Int. Cl.
*B60J 3/00* (2006.01)
*A47H 5/00* (2006.01)
*A47H 1/00* (2006.01)

(52) U.S. Cl. .................... 160/370.22; 160/310; 160/265

(58) Field of Classification Search ............ 160/370.22, 160/310, 311, 314, 265; 296/152, 97.7, 97.8, 296/97.4
See application file for complete search history.

(56) References Cited

U.S. PATENT DOCUMENTS

| | | | | |
|---|---|---|---|---|
| 810,278 A | * | 1/1906 | Hopkins | 160/277 |
| 1,012,239 A | * | 12/1911 | Bourne | 296/84.1 |
| 1,575,695 A | * | 3/1926 | La Rue | 185/45 |
| 1,944,454 A | * | 1/1934 | Park | 160/265 |
| 4,068,383 A | * | 1/1978 | Krebs | 33/767 |
| 5,076,633 A | * | 12/1991 | Hsu et al. | 296/97.4 |
| 5,746,469 A | * | 5/1998 | Nonaka | 296/97.7 |
| 6,047,762 A | * | 4/2000 | Anderson | 160/370.22 |
| 7,537,039 B2 | * | 5/2009 | Fischer | 160/98 |
| 2008/0017335 A1 | * | 1/2008 | Pohl et al. | 160/370.22 |
| 2008/0216972 A1 | * | 9/2008 | Starzmann et al. | 160/310 |
| 2008/0216973 A1 | * | 9/2008 | Walter | 160/313 |
| 2008/0230190 A1 | * | 9/2008 | Hansen | 160/265 |

FOREIGN PATENT DOCUMENTS

| | | | |
|---|---|---|---|
| DE | 20 112 948 U | * | 10/2001 |
| DE | 102004049167 A1 | | 3/2002 |
| DE | 20 2004 014 652 U | * | 3/2006 |
| DE | 102004046783 A1 | | 3/2006 |
| DE | 10040624 A1 | | 4/2006 |
| DE | 202004014652 U1 | | 4/2006 |
| EP | 1123824 A2 | | 2/2001 |
| EP | 1182066 A2 | | 8/2001 |
| EP | 1645448 A1 | | 10/2005 |

\* cited by examiner

*Primary Examiner*—Katherine W Mitchell
*Assistant Examiner*—Jaime F Cardenas-Garcia
(74) *Attorney, Agent, or Firm*—Leydig, Voit & Mayer, Ltd.

(57) ABSTRACT

A side window roll-up shade which has a pull rod attached to a movable edge of a roll-up shade material. The pull rod is carried by two support rods which are guided so that they can move vertically within the door body. At the bottom end of each support rod, a cable is attached, which runs either to a spring motor or to a cable pulley.

13 Claims, 4 Drawing Sheets

SIDE WINDOW ROLL-UP SHADE WITH CABLE DRIVE

FIELD OF THE INVENTION

The present invention relates generally to window roll-up shades, and more particularly, to roll-up shades for the side windows of motor vehicles.

BACKGROUND OF THE INVENTION

For side window roll-up shades of motor vehicles, the current trend is to hide as much as possible the guide devices which guide movement of the roll-up shade during extension. Thus, guide rails, which have been used up until now and which extend at the side of the rectangular part of the window, must be replaced by guide or support rods. When the shade is in an extended position, the support rods, as their name suggests, support the pull rod attached to the free edge of the roll-up shade material. Thus they assume two functions: to guide the pull rod in such a way that it remains on the window, and to generate the necessary pushing force to keep the roll-up shade material unwound from the wind-up shaft and under tension. In the retracted state, the support rods disappear within the interior of the door body and are not visible.

OBJECTS AND SUMMARY OF THE INVENTION

It is an object of the present invention to provide an improved and simplified operating drive for motor vehicles side window roll-up shades having moveable support rods.

In the side window roll-up shade according to the invention, a guide device is provided, which is contained underneath the bottom edge of the window in the door body. With the aid of this guide device, at least one support rod is guided, which can move up and down approximately perpendicular to the bottom edge of the window. At the top end of the support rod, the pull rod is attached to the roll-up shade material in a known manner. With the aid of the pull rod, the force generated by the support rod is distributed across the width of the roll-up shade material so that it is sufficiently taut across the entire width.

A gear motor is provided and cloth tension in the roll-up shade is maintained by traction means connected between the bottom end of the support rod and a spring motor. The guide device for the support rod can be formed by a guide rail having a guide groove of constant cross section. Therefore, it is possible to form a path which is produced from the spatial relationships within the door body of the support rod.

For driving the support rod by means of the traction means, the support rod can carry a projection which extends through the guide groove at the side. Linear traction means can be formed by a cable or a strip. The strip has the advantage that it can be wound up in a way that can be better controlled.

As spring motors acting with both translational and rotary motion can be used. Whichever is used depends on the spatial requirements in the door. In either case, the rotating spring motor requires less space.

In the case of a spring motor with rotary action, a spiral spring in the shape of a leaf spring can be used as the active element. The spring motor can have a spring motor housing which is supported so that it can rotate and on whose cylindrical outer peripheral surface the traction means are attached and in which the spiral spring is housed. The spring motor housing thus acts simultaneously as a cable or strip pulley on which the traction means are wound. The spiral spring is held in place with its inner end, and the spring motor preferably lies in the vicinity of the bottom edge of the window, which saves installation space.

According to a further solution, a wind-up shaft is mounted so that it can rotate underneath the bottom edge of the window, with the roll-up shade material having one edge attached to the wind-up shaft. The edge away from the wind-up shaft is provided with a pull rod which is connected to a support rod. The pull rod is arranged on the top end of the support rod.

For guiding the support rod, a guide device sits underneath the bottom edge of the window, i.e., in the door body. With the aid of the guide device, the support rod is guided vertically at least approximately perpendicular to the bottom edge of the window.

Flexible, linear traction means are attached to the bottom end of the support rod. The traction means lead to a wind-up device, which is coupled to the wind-up shaft, which is driven by means of a gear motor. With such an arrangement, it is possible to keep the tension in the cloth relatively constant, i.e., to become independent of the driving state.

The guide device can be formed by a guide rail having a guide groove that extends across the guide rail with constant cross section. In this way, it is possible to form the desired path on the support rod within the door body. For connecting the support rod to the traction means, the support rod can carry a projection that extends outward through the guide groove. The linear traction means are preferably formed by a cable because it must be deflected in several directions.

The wind-up device can have a cable worm in order to take into account the changing coil diameter of the wind-up shaft. In addition, the wind-up device can be coupled to the wind-up shaft via elastic rotational compensation.

Other objects and advantages of the invention will become apparent upon reading the following detailed description and upon reference to the drawings, in which:

Figure 1:
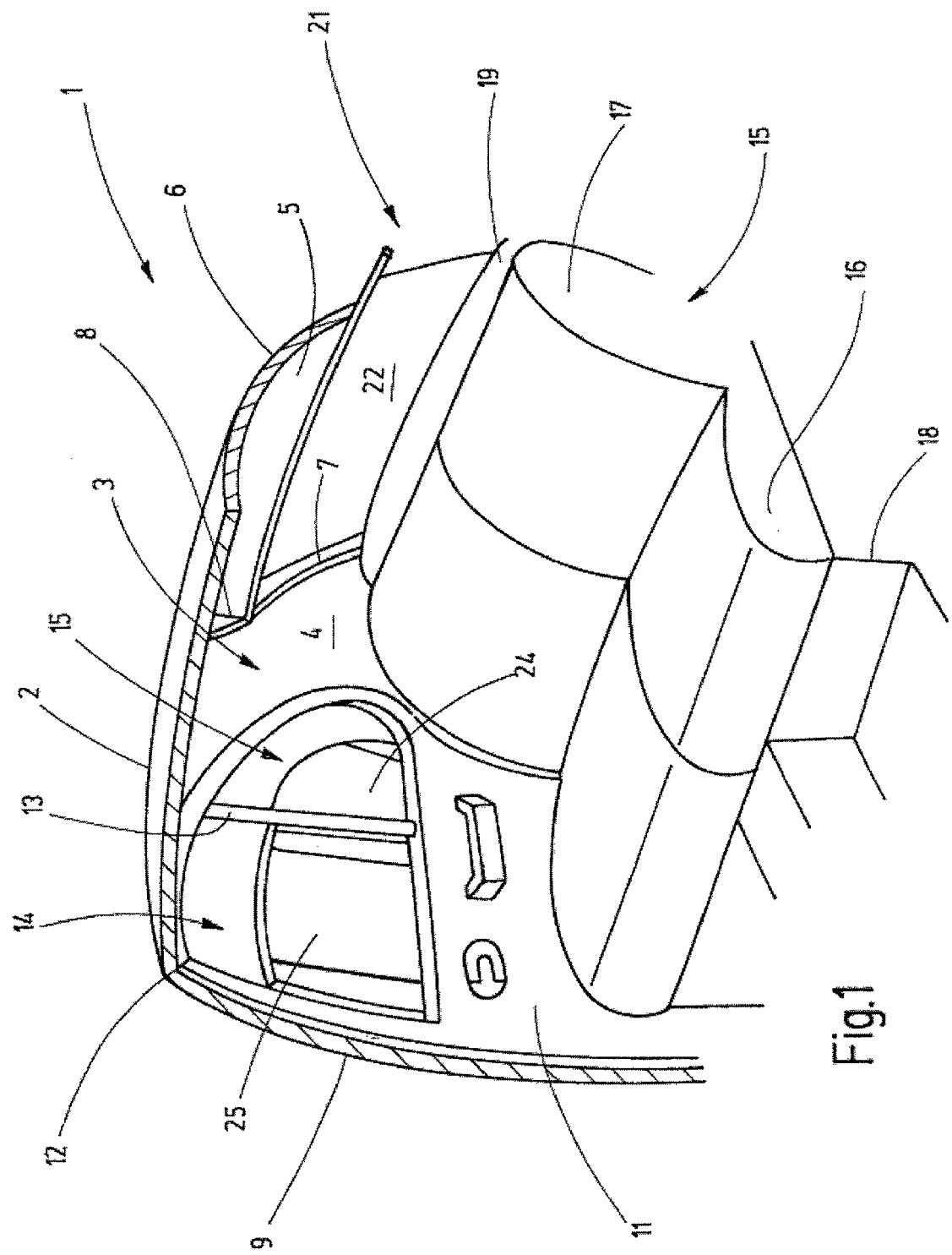
FIG. 1 is a broken away perspective of the rear section of a passenger car having a side window roll-up shade in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DESCRIPTION OF THE PREFERRED EMBODIMENTS

Referring now more particularly to FIG. 1 of the drawings, there is shown the rear area of a passenger car having a side window roll-up shade in accordance with the invention. The figure illustrates a view onto the right inside, which is mirror symmetric to the broken away left inside. Unless otherwise specified, the explanations concerning the right car body side also apply analogously to the left car body side. The representation is simplified; for example, car body internal structures, such as braces and fastening means, are not shown, since their representation is not necessary for understanding the invention.

The illustrated car body section 1 has a roof 2 from which a C-pillar 3 leads downward to a not-shown floor assembly. A corresponding C-pillar similarly is provided on the broken-away side of the vehicle. The C-pillar 3 is provided on the inside with a lining 4.

The roof 2 transitions at its rear edge into a rear window 5, which is bounded on the top side by a top edge 6 of the window. Of the side edges, which run in mirrored symmetrical relation to each other, is a section 7, which transitions at a corner region 8 into the top edge 6 of the window.

The width of the rear window 5 is greater at the height of the midline of the car body than in the region of the top edge 6 of the window. At a distance in front of the C-pillar 3 there is a B-pillar 9, to which a rear right side door 11 is hinged in a known way. The right rear side door 11 contains a window cut-out 12, which is divided by a vertical brace 13 into one essentially rectangular section 14 and one approximately triangular section 15.

The interior of the passenger car further includes a rear seat bench 15 with a rear seating surface 16 and a rear seat back 17. The rear seating surface 17 is set on a floor assembly 18. A rear seat shelf 19 extends between the rear top edge of the rear seat back 17 and the rear window 5.

The rear window 5 is provided with a rear-window roll-up shade 21 having a roll-up shade material 22, as depicted in FIG. 1. Additional roll-up shades are provided at side window 12, namely, a roll-up shade 25 in the rectangular window section 14 and a roll-up shade 24 in the triangular section 15.

Figure 2:
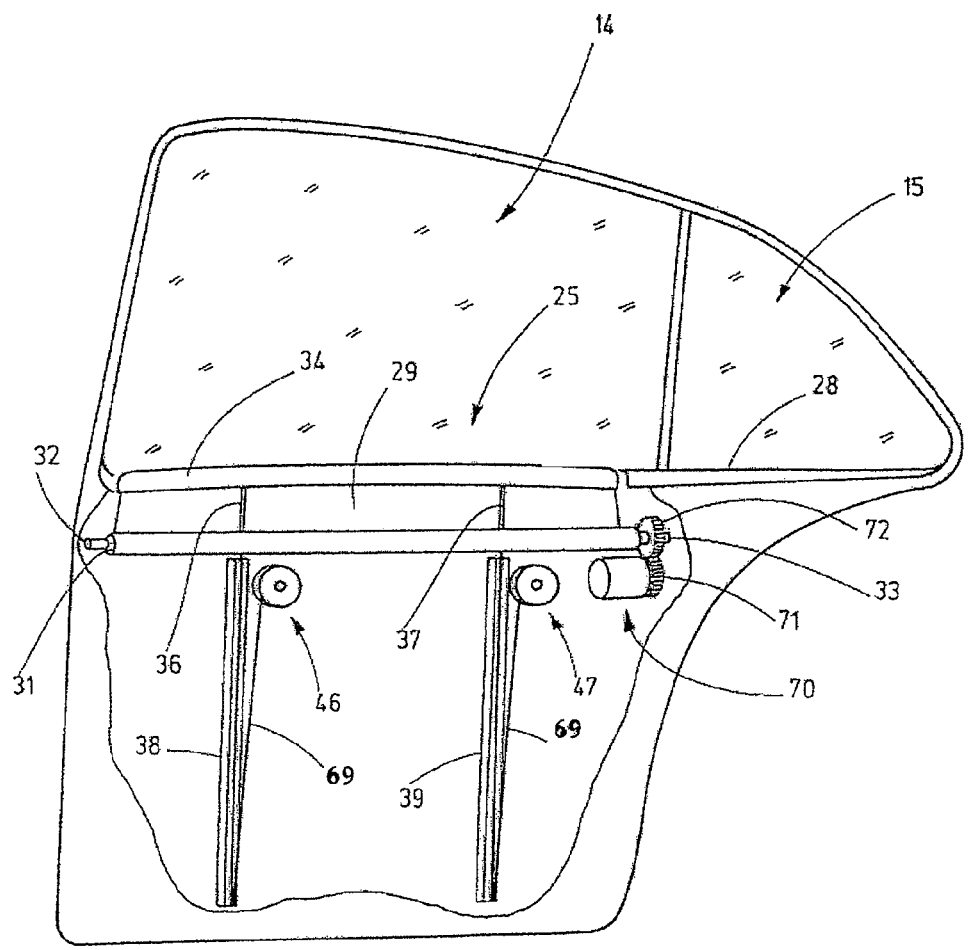
FIG. 2 is a schematic of the rear right side door of the motor vehicle shown in FIG. 1 with the inner lining broken away, showing the operating drive for the side window roll-up shade.

The side door is shown enlarged in FIG. 2, with inner lining broken away in order to be able to see the setup of the side window roll-up shade 25. As seen in FIG. 2, a bottom side of the window cutout is bounded by a bottom edge 28 of the window, which has a suitable slot that cannot be seen through which the window roll-up shade 25 can be extracted from the body of the side door 11. The window roll-up shade 25 includes a roll-up shade material 29, which is attached with one edge to a wind-up shaft 31. The wind-up shaft 31 is supported so that it can rotate underneath the bottom edge 28 of the window in the body of the door with the aid of bearing journals 32, 33.

The roll-up shade material 29 is essentially non-expandable, which is suitable for generating an adequate shading effect. The outlines of the roll-up shade material 29 correspond approximately to the size of the window cutout 14. The roll-up shade material 29 is provided with a pull rod 34 at the free edge.

As a guide device for the pull rod 34 between the retracted position, as shown in FIG. 2, and an extended position, two support rods 36,37 are provided. The support rods 36, 37 in this case are cylindrical spring bars, which are in the position to support and to move the pull rod 34 with sufficient resistance against buckling. The top ends of the two support rods 36,37 are connected to the pull rod 34.

The two support rods 36, 37 run in guide rails 38,39, which are held in the door body and do not project upwardly past the bottom edge 28 of the window. With the aid of the two guide rails 38, 39, the support rods 36, 37 are slidingly guided approximately perpendicular to bottom edge 28 of the window. Within the door body, the guide rails 38, 39 need not necessarily extend straight over their entire length; for example, they can be curved about an axis parallel to the vehicle axis in order to follow the course of the door.

Figure 3:
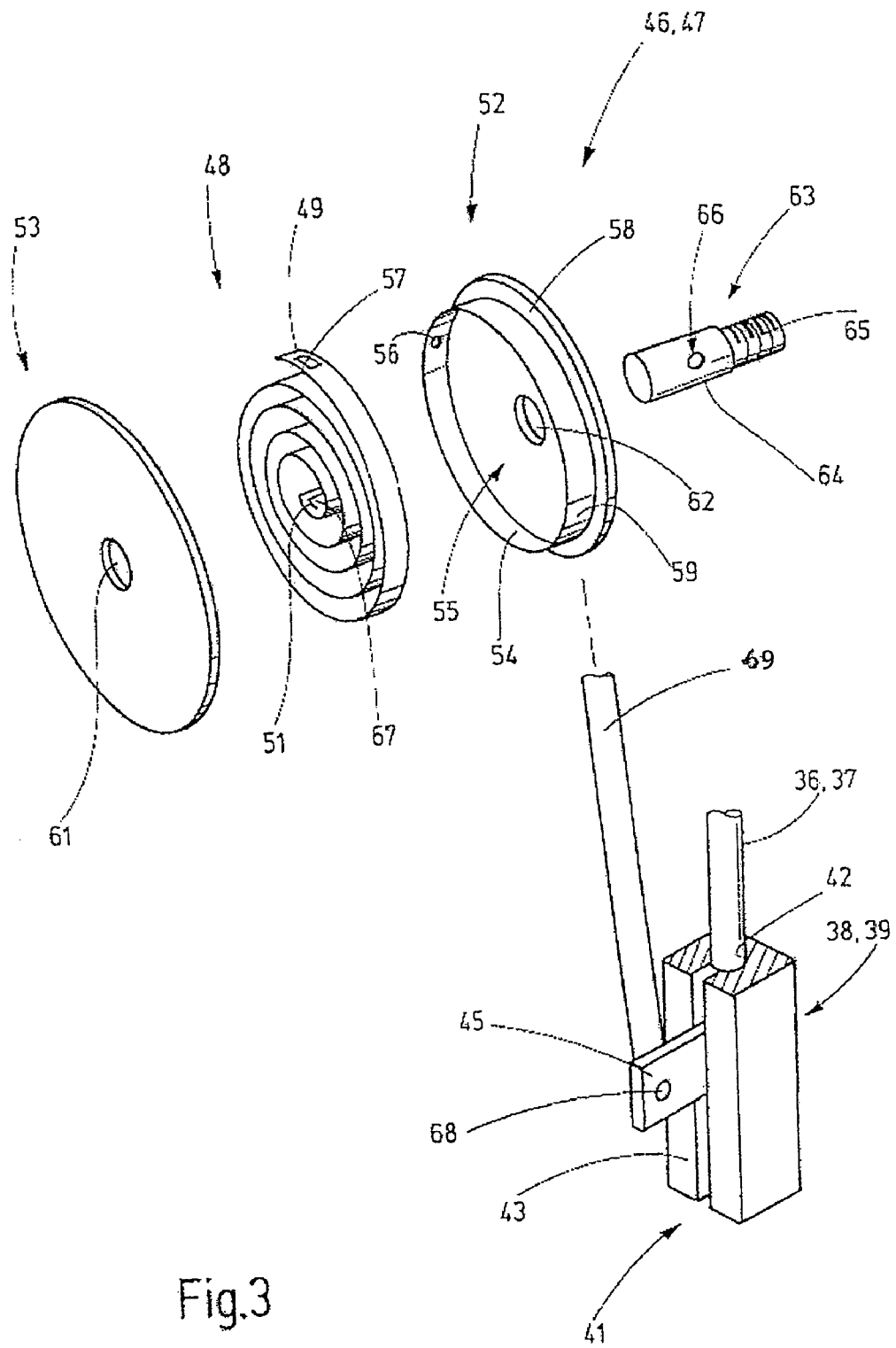
FIG. 3 is an enlarged exploded perspective of a spring motor of the side window roll-up shade shown in FIG. 2.

As can be seen from FIG. 3, the two guide rails 38, 39, which in this instance are identical, each have a guide groove 41 which has an undercut structure. The groove profile includes a cylindrical groove chamber 42 and a rectangular groove slot 43, whose width is smaller than the diameter of the groove chamber 42 to produce an undercut structure. The diameter of the groove chamber 42 corresponds to the outer diameter of the support rod 36,37 guided therein. As can also be seen in FIG. 3, a clip 45, which projects outward through the slot 43, is connected to each of the two support rods 36, 37.

Each of the two support rods 36, 37 is biased into the extended position by a separate spring motor 46, 47, which sit just underneath the bottom edge 28 of the window. In the embodiment of FIG. 2, they are shown underneath the wind-up shaft 31. Since the two spring motors 46,47 have the same construction, only one need be described in detail.

The inner setup of the two spring motors 46, 47 is depicted in FIG. 3.

As can be seen, each spring motor includes a spiral spring 48 constructed as a strip spring with an outer spring end 49 and an inner spring end 51. Furthermore, each spring motor 46, 47 includes a spring motor housing 52 with an associated cover 53. The housing 52 has a cup-like construction with a cylindrical housing wall 54, which defines a cylindrical interior 55 in the peripheral direction. On the housing wall 54 there is a projection 56, which extends inwardly, onto which the outer spring end 49 with an opening 57 is pushed, forming a positive fit. The wall 54 is provided integrally with a side wall 58, which projects in the radial direction past an outer peripheral surface 59 of the wall 54.

The cover 53 has the same diameter as the wall 58 and it can be locked or latched to the wall 54 by means of an appropriate anchoring means. A bearing borehole 61, 62 for a shaft 63 extends centrally through the walls 53,58. The shaft 63 is assembled from a cylindrical section 64 and a threaded piece 65. The cylindrical section 64 carries a tab 66, which extends in a radial direction and which is constructed to be pushed in an opening 67 in the inner spring end 51. Appropriate retaining or snap rings (not shown) can be provided for securing the housing 52 on the axial section 64 of the shaft 63 in the axial direction. With the aid of the threaded section 65, it can be seen that the shaft 63 can be screwed tightly onto a panel in the door body.

The housing 52 together with the mounted disk 53 forms a flanged wheel with a cylindrical outer peripheral surface formed by the outer peripheral surface 59 and rims. On this surface, a tension strip 69 constructed as a textile strip is attached with one end. The other end of the strip 69 is connected to the bracket 45, for example, by means of a rivet 68.

Finally, the side window roll-up shade 25 also includes a gear motor arrangement 70, which drives by means of an output gear 71 a gear 72 fixed coaxially to the wind-up shaft 31.

The side window roll-up shade 25 functions as follows:

In the retracted state, the roll-up shade material 29 is wound onto the wind-up shaft 31 until the top side or top edge of the pull rod 34 is approximately flush with the bottom edge 28 of the window. In this position, the two support rods 36, 37 have their maximum insertion depth 38, 39. This means that the tension strips 67 are unwound from the spring motors 46, 47 to a maximum.

The self-locking effect of the gear motor 70 prevents the spring motors 46,47 from pulling the roll-up shade material 29 from the wind-up shaft 31. As long as the motor 70 is turned off, the side window roll-up shaft 25 remains in the retracted position as shown.

If the user of the side window roll-up shade 25 wishes to extend the shade material, the geared motor 70 can be operated. In this way, the wind-up shaft 31 is set into rotation to unwind the roll-up shade material 29. As the roll-up shade material 29 is unwound from the wind-up shaft 31, the two spring motors 46,47 push the pull rod 34 upwardly by means of support rods 36,37. This effect comes about because the spring motors 46,47, via the tension strips 67, attempt to lift or shift the bottom ends of the support rods 36, 37 upwardly in the direction toward the bottom edge 28 of the window.

If the roll-up shade material 29 is completely extended, i.e., the pull rod 34 has come to the top edge of the window, and the gear motor 70 is stopped by a corresponding controller. In this way, the spring motors 46,47 are prevented from pushing the support rods 36,37 further because the non-expandable roll-up shade material 29 stops further movement of the roll-up shade material 29 due to the braked wind-up shaft 31.

In the top position, the two tension strips 69 are wound onto the appropriate spring motor housing 52 of the respective spring motor 46,47 to a maximum degree. In the topmost position, so that the tension of the tension strips 69 is maintained, the bottom end of each support rod 36, 37 must remain a corresponding distance underneath the respective spring motor 46, 47.

For retracting the side window roll-up shade 25, the gear motor 70 is set in gear and operated in an opposite direction of rotation. In this way, the wind-up shaft 31 is set in rotation to wind up the roll-up shade material 29. Because the roll-up shade material 29 is non-expandable, the corresponding forces are transmitted via the shade material to the pull rod 34 and from there to the support rods 36,37, which are thereby forced to become inserted increasingly deeper into the guide rails 38,39. For the downward movement, the tension strips 67 are unwound from the spring motors 46,47 with resultant biasing of the spring motors 46,47.

The use of a tension strip has the advantage that the layers are wound up orderly one on top of the other. The use of cords is also possible, but this brings a certain amount of risk with respect to whether the wound layers will come to lie one above the other or become damaged over the course of time.

Figure 4:
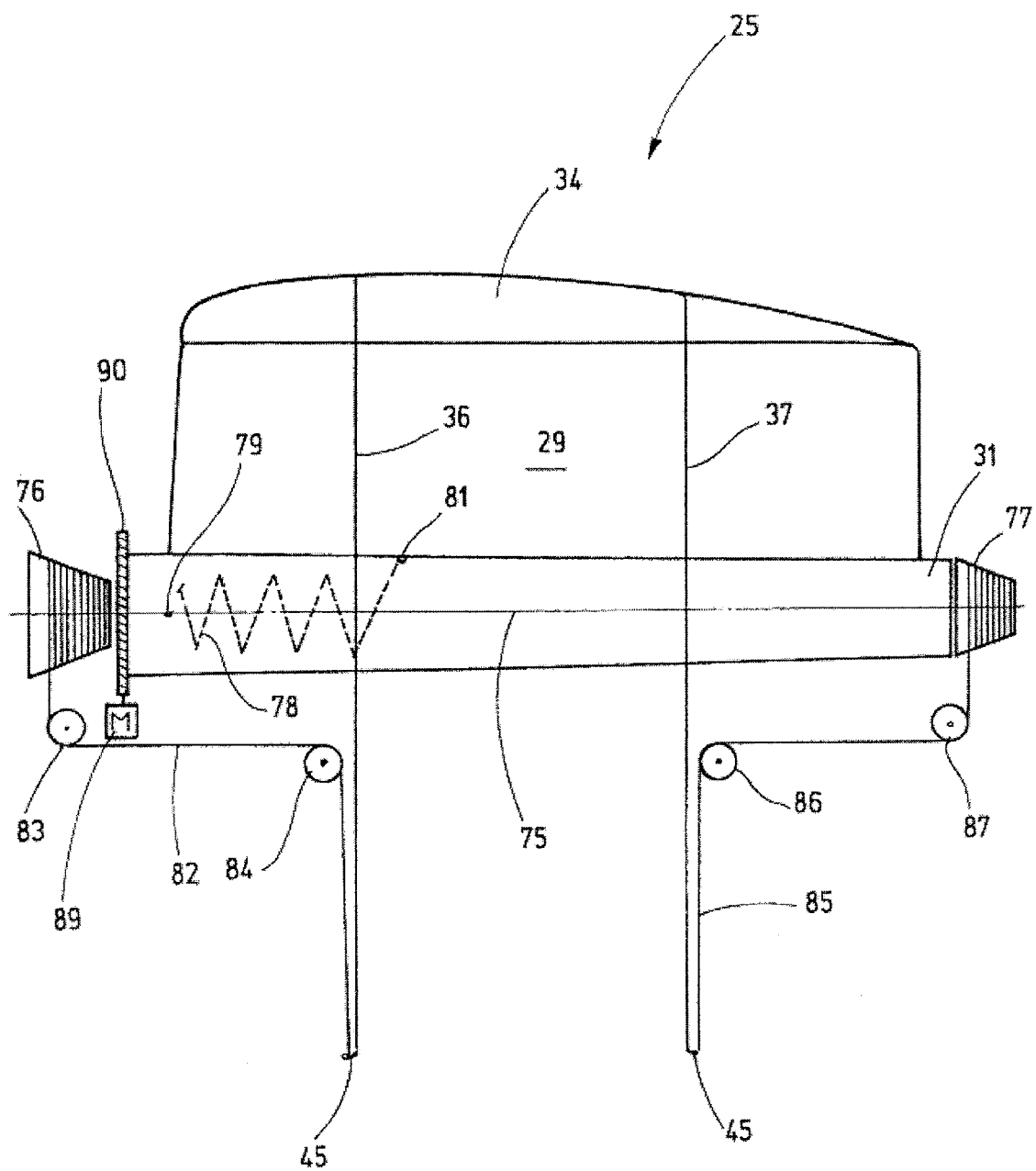
FIG. 4 is an enlarged broken away depiction of the right side door with an alternative embodiment of side window roll-up shade according to the invention.

FIG. 4 shows another embodiment of a side window roll-up shade in which the support rods are driven by means of a kind of backward-pulling device. Parts similar to those described above have been given similar reference numbers and need not be explained again.

The side window roll-up shade 25 according to FIG. 4 also uses two buckling-resistant support rods 36,37, which are arranged and guided in the same manner as explained in connection with FIG. 2. The guide rails also have been omitted in the depiction in FIG. 4, as well as the door body, because those components are not needed for further understanding of the alternative embodiment.

The roll-up shade material 29 in this case is wound onto a tubular wind-up shaft 31. A shaft 75, shown schematically, extends through the tubular wind-up shaft 31 with its opposite ends each locked in rotation with a cable worm or pulley 76 or 77. In addition, the shaft 75 is coupled to the wind-up shaft 31 via a helical spring 78 which acts as a torsion spring. The helical spring 78 is locked in rotation at 79 with the shaft 75 and at 81 with the wind-up shaft 31. A tension cable 82 leads from the cable worm 76 via deflection rollers 83,84 connected in between to the bottom end of the support rod 36, as explained in connection with FIG. 2.

Another pull cable 85 leads from the bottom end of the support rod 37, i.e., from the clip 45 provided there via deflection rollers 86, 87 to the cable worm 77. In this way, a kinematic chain is formed. Overall, two closed kinematic chains are formed. One begins, e.g., at the top end of the support rod 36 and leads from there via the pull rod 34, the roll-up shade 29, the wind-up shaft 31 to the helical spring 78 and from there via the shaft 75, the cable worm 76, and the cable 82 back to the support rod 36, but to the other end.

The other kinematic chain connected in parallel includes the support rod 37, the pull rod 34, the roll-up shade material 29, and the wind-up shaft 31, which is attached, as before, to the helical spring 78. From here, the kinematic chain is guided further via the shaft 75 to the cable worm 77 and from there via the cable 85 to the bottom end of the support rod 37. As can be seen, the helical spring 78 lies in both kinematic chains, with the helical spring in this way maintaining the tension in the roll-up shade material 29.

The window roll-up shade 25 described thus far can be manually activated. In that case, the user grabs the pull rod 34 and guides it from the bottom edge 28 of the window in the direction toward the top edge of the window. In this way, the roll-up shade material 29 is unwound from the wind-up shaft 31. The rotational movement of the wind-up shaft 31 is transmitted via the helical spring 78 used as a compensation element to the shaft 75 and thus to the two cable worms 76,77. The anchoring is selected so that when the roll-up shade material 29 unwinds from the wind-up shaft 31, the two pull cords 82, 85 are simultaneously wound onto the corresponding cable worms 76,77, respectively. Each cable is wound to the same degree as the unwinding from the roll-up shade material so that the tension in the two kinematic chains remains nearly constant.

For retracting the hand-operated side window roll-up shade 25, the user presses the pull rod 34 downward. In this instance, without the aforesaid kinematic chains, the roll-up shade material 29 would become slack. However, this is prevented during retraction because the downward movement of the pull rod 35 is led via the two support rods 36,37 into the tension cords 82,85. The downward movement of the tension cords 82,85 sets the cable worms 76,77 in gear in the appropriate of directional rotation so that the appropriate end 79 of the helical spring 78 is entrained, which then transfers the rotational movement to the wind-up shaft 31. Because the cable worms 76,77 ensure that the rotational speed of the shaft 75 remains nearly the same as the rotational speed of the wind-up shaft 31, that is, independent of the wound-up diameter, the biasing of the helical spring 78 between the two points 79, 81 remains constant, which means that the torque introduced into the wind-up shaft 31 also remains constant. By pressing down on the pull rod 34, the user also finally sets the wind-up shaft 31 in gear via the pull cords 82,85, so that the roll-up shade material 29 is wound up.

It will be seen by a person skilled in the art that, through the use of a motor 89, which is coupled, for example, via a worm gear 90 to the wind-up shaft 31, the described side window roll-up shade arrangement can also be electrically powered.

From the foregoing, it can seen that a side window roll-up shade is provided that has a pull rod attached to the moving edge of the roll-up shade material. The pull rod is carried by two support rods which are guided so that they can move vertically within the door body. At the bottom end of each support rod, a cable is attached, which runs either to a spring motor or to a cable pulley, which is connected to the wind-up shaft via a rotational compensator.

The invention claimed is:

1. A side window roll-up shade for motor vehicles (1) with a side window (14) having a bottom window edge (28) and a top window edge comprising:
- a wind-up shaft (31) supported for rotation underneath the bottom edge (28) of the side window, a roll-up shade material (29) having a shape corresponding to the shape of the side window (14),
- said roll-up shade material (29) having one edge attached to the wind-up shaft (31) and a second edge away from the wind-up shaft (31),
- a pull rod (34) attached to said second edge of the roll-up shade material (29) away from the wind-up shaft (31),
- at least one support rod (36, 37) having a top end connected to the pull rod (34) and a bottom end,
- a guide device (38, 39) for the support rod (36, 37) arranged underneath the bottom edge (28) of the window for guiding the support rod (36, 37) for vertical movement transversely to the bottom edge (28) of the window,
- a flexible linear traction element (69) co acting with a bottom end of the support rod (36, 37),
- a spring motor (46,47) disposed underneath the bottom edge (28) of the side window to which an end of said traction element (69) is attached, said spring motor (46, 47) having a spiral spring that operates with rotary motion, a gear motor (70) coupled to the wind-up shaft (31) for rotatably driving the wind-up shaft, and said spiral spring of said spring motor (46,47) being operable to cause said flexible linear traction element (69) to move said support rod (36,37) and pull rod (34) in response to said gear motor rotatably driving the wind-up shaft.

2. The side window roll-up shade of claim 1 in which said linear traction element (69) is anchored to a bottom end of the support rod (36,37).

3. The side window roll-up shade of claim 1 in which said spring motor is disposed adjacent the bottom edge (28) of the window.

4. The side window roll-up shade of claim 1 in which said guide device (38, 39) for the support rod (36, 37) is a guide rail having a guide groove (41).

5. The side window roll-up shade of claim 4 in which said support rod (36, 37) has a projection (45) that extends outwardly through said guide groove (41) of said guide rail.

6. The side window roll-up shade of claim 5 in which said linear traction element (69) is attached to said projection (45).

7. The side window roll-up shade of claim 1 in which said linear traction element (69) is a strip.

8. The side window roll-up shade of claim 1 in which said linear traction element (69) is a cable.

9. The side window roll-up shade of claim 7 in which said strip (69) is a textile strip.

10. The side window roll-up shade of claim 1 in which said spring motor (46, 47) has an active element in the form of a spiral leaf spring (48).

11. The side window roll-up shade of claim 1 in which said spring motor (46,47) has a housing (52,53) within which said spiral spring is housed, and said housing (52,53) being rotatable and having an outer cylindrical peripheral surface (59) to which said traction element (69) is attached.

12. The side window roll-up shade of claim 11 in which said spiral spring (48) has an inner spring end (51) fixed in place in said housing.

13. The side window roll-up shade of claim 1 in which said spiral spring of said spring motor being operable to raise said support rod (36,37) and pull rod (34) in response to said gear motor rotatably driving said wind-up shaft in a direction for unwinding of the roll-up shade from the wind-up shaft.

\* \* \* \* \*